US010664332B2

(12) United States Patent
Kohlmeier et al.

(10) Patent No.: US 10,664,332 B2
(45) Date of Patent: May 26, 2020

(54) APPLICATION PROGRAMMING INTERFACES FOR IDENTIFYING, USING, AND MANAGING TRUSTED SOURCES IN ONLINE AND NETWORKED CONTENT

(71) Applicant: Microsoft Technology Licensing, LLC, Redmond, WA (US)

(72) Inventors: Bernhard S. J. Kohlmeier, Seattle, WA (US); Douglas M. Taylor, Kirkland, WA (US); Victor Poznanski, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,216

(22) Filed: May 25, 2018

(65) Prior Publication Data
US 2019/0361757 A1 Nov. 28, 2019

(51) Int. Cl.
*G06F 9/54* (2006.01)
(52) U.S. Cl.
CPC .................... *G06F 9/548* (2013.01)
(58) Field of Classification Search
CPC ....................................................... G06F 9/541
USPC ........................................................ 719/328
See application file for complete search history.

(56) References Cited

U.S. PATENT DOCUMENTS

| 7,249,123 | B2  | 7/2007  | Elder et al. |
| 7,668,887 | B2* | 2/2010  | Vella ................... G06F 16/9535 707/706 |
| 7,698,442 | B1  | 4/2010  | Krishnamurthy et al. |
| 8,056,128 | B1* | 11/2011 | Dingle .................... G06F 16/35 726/22 |
| 8,078,617 | B1  | 12/2011 | Neveitt et al. |
| 8,515,972 | B1* | 8/2013  | Srikrishna ............. G06F 16/951 707/750 |
| 8,615,481 | B1  | 12/2013 | Pragada et al. |
| 8,898,152 | B1  | 11/2014 | Ie et al. |
| 2004/0049478 | A1 | 3/2004 | Jasper et al. |
| 2005/0165709 | A1 | 7/2005 | Bromberg et al. |

(Continued)

FOREIGN PATENT DOCUMENTS

WO  2007142941 A2  12/2007

OTHER PUBLICATIONS

"Building a knowledge base for IBM Content Classification V8.8", Retrieved From: http://www-01.ibm.com/support/docview.wss?uid=swg27020839, Apr. 11, 2017, 13 Pages.

(Continued)

*Primary Examiner* — Andy Ho
(74) *Attorney, Agent, or Firm* — Talem IP Law, LLP

(57) ABSTRACT

Application programming interfaces (APIs) are provided that provide functionality of accessing, ranking, scoping, enrichment, cleansing, and cohort determination of content based on a corpus of trusted sources. For example, in response to receiving a request for ranked objects via a ranking API, a system can obtain objects from a corpus identified by the request for ranked objects and a corresponding rank and/or score of each of the objects and provide the objects and the corresponding rank and/or score of each of the objects to a source of the request for ranked objects, wherein the corpus stores identified trusted sources that are scored based at least on a document activity score.

20 Claims, 10 Drawing Sheets

(56) References Cited

U.S. PATENT DOCUMENTS

| | | | |
|---|---|---|---|
| 2006/0004748 A1 | 1/2006 | Ramarathnam et al. | |
| 2007/0150468 A1 | 6/2007 | Goldman et al. | |
| 2011/0078049 A1* | 3/2011 | Rehman | G06Q 10/10 |
| | | | 705/27.1 |
| 2011/0252342 A1 | 10/2011 | Broman | |
| 2011/0276601 A1 | 11/2011 | Pin et al. | |
| 2013/0117668 A1 | 5/2013 | Joseph et al. | |
| 2016/0092513 A1 | 3/2016 | Goodwin et al. | |
| 2016/0275069 A1 | 9/2016 | Bastide et al. | |
| 2018/0232394 A1* | 8/2018 | Danziger | H04L 67/02 |
| 2019/0129952 A1* | 5/2019 | Yoshida | G06F 16/93 |

OTHER PUBLICATIONS

"Talisma: Finding the information you need is easier than you think", Retrieved From https://web.archive.org/web/20140909200247/http://www.talisma.com/products/Product%20Sheet/Talisma%20Knowledge%20Base.pdf, Sep. 9, 2014, 4 Pages.

Dagstuhl KM Seminar: Final Program and Abstracts, Retrieved from: https://www.google.co.in/url?sa=t&rct=j&q&esrc=s&source=web&cd=2&cad=rja&uact=8&ved=0ahUKEwil8ZS3wY3TAhVLp48KHduCBZYQFggiMAE&url=https%3A%2F%2Fwww.dagstuhl.de%2FReports%2F00%2F00281.doc&usg=AFQjCNG3b6Og90ORpmssRy9o_LepOuCcdA&sig2=agg9pkPu7ulzkXJGoaxyqQ&bvm=bv.151426398%2Cd.c2l, Retrieved Date: Apr. 4, 2017, 19 Pages.

"International Search Report and Written Opinion Issued in PCT Application No. PCT/US19/29644", dated Jun. 24, 2019, 11 Pages.

"International Search Report and Written Opinion Issued in PCT Application No. PCT/US2018/024235", dated Jun. 5, 2018, 14 Pages.

"Non-Final Office Action Issued in U.S. Appl. No. 15/872,785", dated Nov. 29, 2019, 23 Pages.

* cited by examiner

APPLICATION PROGRAMMING INTERFACES FOR IDENTIFYING, USING, AND MANAGING TRUSTED SOURCES IN ONLINE AND NETWORKED CONTENT

BACKGROUND

Accumulating and uncovering reliable knowledge over the Internet can be a challenge. Currently, many algorithms for returning search results via common search engines include paid advertisements. Popular content across a broad spectrum of intents, including commercial ones, tends to be pushed up in positions by a ranker of the search engine, which causes results served up by the search engines to reflect the behavior of their users. Therefore, the bias of users can be reflected directly in the results. In addition, the click stream can cause popular articles to become even more popular, establishing and reinforcing a consensus about what is and is not important. Ranking of results may be based on the number of "clicks" a link may get over time, which can result in "clickbait" attempts to increase visibility, or may be based on keyword tags, which can also be subject to manipulation.

Furthermore, misinformation or disinformation on the web can lead to serious errors. For example, in search boxes providing mined answers, researching on the web can include wrong and partially wrong or outdated results. Mined answers present what looks like authoritative facts. Superficial research can lead to students picking up wrong or conflated information, particularly when the results are scrapes (e.g., via bots across the web) combining different sources, which can also suffer the same problems as mentioned above.

BRIEF SUMMARY

Application programming interfaces (API) are provided for identifying, using, and managing trusted sources in online and networked content. APIs are provided that provide functionality of accessing, ranking, scoping, enrichment, cleansing, and cohort determination of content based on a corpus of trusted sources. The use, reuse, and citing of content from data sources and productivity applications (including content creation and content consumption applications) can be collected (when there are appropriate user permissions to do so) and used to identify trusted sources of content. When a uniform resource locator (URL) or other object is acted upon or otherwise used in a document, the URL is given a score based on the manner in which the URL was used (including how the URL entered the document), attributes of the document itself, and, optionally, user history. As users act upon the same URLs, the scores from those actions are accrued to that URL. A URL with an accrued score (value) above (or equal to) a threshold value can be added to a corpus of trusted sources. The described APIs leverage the scoring and corpus of trusted sources to enable a number of features, including, but not limited to the ranking, scoping, enrichment, cleansing, and cohort determination of content.

An API for ranking ("ranking API") is provided that can support search engines and other search applications. In one case, the ranking API can receive a request for all data and corresponding rank of a URL or other object based on accrued score. The request can be directed to a particular corpus type (e.g., public sites, enterprise documents, internal sites). In response to receiving the request, the ranking API can provide, for the particular corpus type(s), the URLs or other objects and the corresponding rank in the corpus/corpora of the particular corpus type(s). In some cases, instead of or in addition to rank, the scores may be provided.

In another case, the ranking API can receive a request for all data having a corresponding accrued score above a specified threshold. In response to receiving the request, the ranking API can provide, for the particular corpus type(s), the URLs or other objects having a score above the specified threshold and their corresponding rank and/or score in the corpus/corpora of the particular corpus type(s).

An API for scoping ("scoping API") is provided that can support scoped searches. In one case, the scoping API can receive a request for a list of domains for use in a scoped search. The request can include a sort parameter (e.g., paste count, unique user count, paper count, quality score, etc.), a threshold score (e.g., a "threshold" such as a minimum value for the score), and content type (e.g., all, image, table, reference). The scoping API can return the list of domains that satisfy the request (e.g., using the sort parameter, threshold score, content type, or combination thereof). In some cases, a ranking score can be produced from all or a subset of potential ranking features and provided in response to a request via one of the scoping APIs. In some cases, a developer may select a ranking function from a set of available ranking functions or provide a desired ranking function that, when communicated as part of a request, can be used to perform a custom ranking on the corpus.

An API for enrichment ("enrichment API") is provided that can, in response to receiving a request that includes a URL, provide additional properties and metadata about a domain or page corresponding to the URL. The additional properties and metadata can be the properties and metadata stored in the corpus maintained by the system, including, but not limited to, author, publisher, year (or date) made, how much activity within productivity applications (e.g., interactions such as use and reuse), and number of times cited or referenced.

An API for cleansing ("cleansing API") is provided that can remove or identify domains or pages that do not satisfy a quality score. In one case, the cleansing API can receive a request for a quality score for a particular domain or webpage. The request can include the URL and URL type (e.g., domain or webpage). In another case, the cleansing API can receive a request for a quality score for a list of domains and/or webpages. The request can include the list of URLs and corresponding URL type(s).

An API for cohort determination ("cohorts API") is provided that can, in response to a request for related domains that includes a list of domains, identify related domains that may be relevant based on interactions/graph connections. In some cases, a similarity function can be included in the request to provide a customized cohort determination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

APIs are provided for identifying, using, and managing trusted sources in online and networked content. The described APIs can provide functionality of accessing ranking, scoping, enrichment, cleansing, and cohort determination of content based on a corpus of trusted sources.

The described APIs can perform functionality on at least one corpus, and be applied to improve applications including, but not limited to, productivity applications and search applications.

Figure 1:
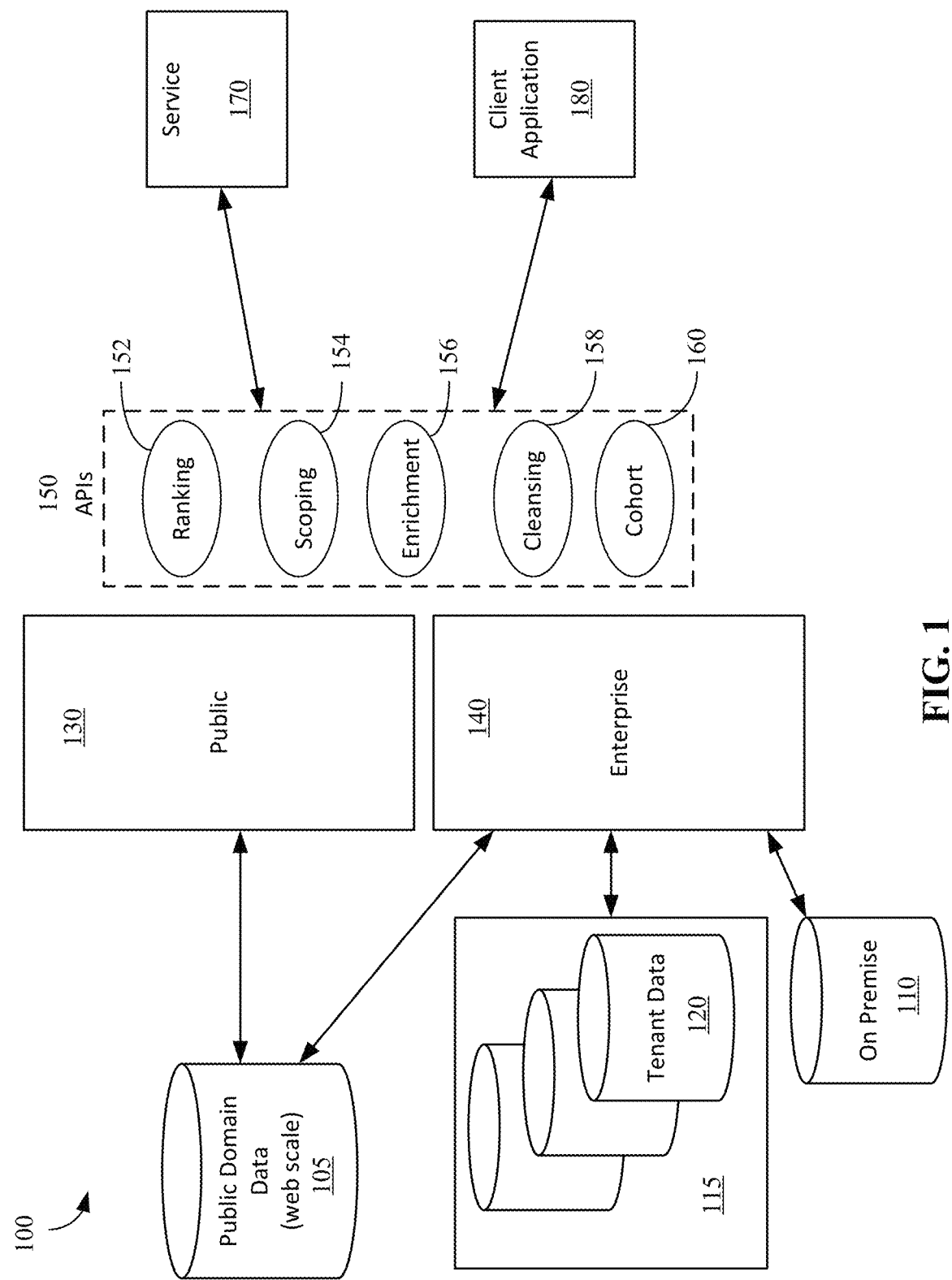
FIG. 1 illustrates an example operating environment with APIs for identifying, using, and managing trusted sources in online and networked content.

FIG. 1 illustrates an example operating environment with APIs for identifying, using, and managing trusted sources in online and networked content.

Referring to FIG. 1, a web scale corpus 105 and enterprise corpora managed on-premise (e.g., as at least one on-premise corpus 110) or in a multi-tenant system 115 (e.g., as a tenant corpus 120—with at least one tenant corpus per tenant) can store identified trusted sources of online and networked content. These corpora can be managed and generated by a public service 130 or an enterprise service 140 based on the use, reuse, and citing of content from data sources and productivity applications (including content creation and content consumption applications).

Productivity applications include integrated and singular applications for word processing, spreadsheets, presentations, database management, email, and more. Included in, or related to, productivity applications are content creation applications and content consumption applications. Examples of Office productivity software include Microsoft Office and Office 365 from Microsoft Corp., Apache OpenOffice, LibreOffice from The Document Foundation, and Google Docs or G Suite from Google Cloud; and example of singular productivity applications include Microsoft Word and Microsoft OneNote from Microsoft Corp., Scrivener from Literature & Latte, and Apple Pages from Apple Inc.

Students and general consumers of productivity applications and services can choose to contribute to the web-scale corpus 105 anonymously or using their user identifier profile (for the software services). An enterprise can build a tenant specific professional knowledge exchange corpus by having knowledge workers contribute to the trusted knowledge of their organization (e.g., in a tenant corpus 120 or on-premises corpus 110). The daily professional use of the productivity applications within the tenant can provide the signal for the system (and enterprise service 140) to generate the corpora. The scoring system for the tenant may be adjusted to the trusted nature of the community. Enterprise users can choose to contribute anonymously or using their organization identifier to tenant specific corpora (e.g., tenant corpus 120) and, based on policy, may contribute to the web-scale corpus 105. An enterprise may have a plurality of corpora. In some cases, the corpora can be based on units within the enterprise. For example, one or more corpora can be established for departments (e.g., one for Sales, one for Engineering, etc.) geographic regions, and even manager groups.

As mentioned above, the use, reuse, and citing of content (e.g., objects) from data sources and productivity applications can be collected (when there are appropriate user permissions to do so) and used to identify trusted sources of content by pubic 130 and/or enterprise 140 services.

Objects of content can include, but are not limited to URLs, media, documents, and components such as text, ink, images, rich text, and structured data. Trusted content refers to content that has scholarly or professional value (in contrast with advertisements and in some cases works of fiction). Trusted content does not have to be universally acknowledged as being true. A trusted content set can reflect a diversity of points of view, which add to a more complete understanding of the topic involved and which may encourage critical thinking.

High value activities, or tasks, performed on URLs (or other objects) by a user of a productivity application can be scored by the public and/or enterprise services (130, 140) and, for the URLs, the page and domain will be stored. In the course of professional, scholarly, or scholastic content creation, users of productivity applications perform tasks that can indicate that the content being used can be trusted. For example, documents with citations or footnotes may be considered more trustworthy, or even that information was inserted from a researcher application may be considered a "high value" activity. As another example, the complexity and type of document the user is working on can reflect a "high value" activity.

To illustrate how the scoring operates to identify trusted sources, conceptually, the page(s) and domain(s) of the URLs can be thought of as being placed in a stack. Further actions with the URLs (e.g., the URL page and/or domain, a component or part of a document, and other objects) will accrue to the value of the asset (e.g., of that particular object). The value accrued by the URL (page and/or domain) or other object (e.g., component or part of a document) can be used to generate the corpus of public content (e.g., web scale corpus 105) and, for non-public content, a corpus of private content (e.g., for an enterprise such as on-premise corpus 110 and tenant corpus 120).

Accordingly, when a URL or other object is acted upon or otherwise used in a document, the URL (or other object) is given a score based on the manner in which the URL (or other object) was used (including how the URL or other object entered the document), attributes of the document itself, and, optionally, user history. As users act upon the same URLs (or other objects), the scores from those actions are accrued to that URL (or other object). A URL (or other object) with an accrued score (value) above (or equal to) a threshold value can be added to a corpus of trusted sources.

The scoring and corpus of trusted sources is leveraged to enable a number of features, including, but not limited to the ranking, scoping, enrichment, cleansing, and cohort determination of content. In particular, one or more APIs 150 can be provided to support at least one of ranking 152, scoping 154, enrichment 156, cleansing 158, and cohort determination 160 using the scoring and corpus of trusted sources available in the web-based corpus 105 and/or tenant corpora (e.g., 110 and 120).

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and, when implemented over a network, may be implemented as a set of Hypertext Transfer Protocol (HTTP) request messages and a specified format or structure for response messages according to a REST (Representational state transfer) or SOAP (Simple Object Access Protocol) architecture.

The described APIs may be deployed locally or at a cloud service. Local deployment can support on-premise functionality, for example, for an enterprise to maintain additional security features.

A service 170 (e.g., any application-related or other software service) or client application 180 can access the described features via one of the APIs 150.

Components (computing systems, storage resources, and the like—including those for corpora 105, 110, and 120, services 130 and 140, service 170, and application 180, etc.) in the environment 100 may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

It should be understood that collection of and access to enterprise information can be protected according to any of the compliance requirements for privacy and data access and handling. Similarly, web-based corpora are compliant to ensure user data privacy and security in any collection and access scenarios.

FIGS. 2A-2H illustrate example APIs for identifying, using, and managing trusted content.

A ranking API is provided that can support search engines and other search applications (and other related services). In one case, referring to FIG. 2A, the ranking API 200 can receive (202) a request for all data and corresponding rank of a URL or other object based on accrued score. The request can be directed to a particular corpus type (e.g., public sites, enterprise documents, internal sites). In response to receiving the request, the ranking API 200 can get (204) and provide (206), for the particular corpus type(s), the URLs or other objects and the corresponding rank in the corpus/corpora of the particular corpus type(s). In some cases, instead of or in addition to rank, the scores may be provided. As an example implementation of the method, the call can be GetAllData(type). The response can be a Model and provide a snapshot of the data with rankings and/or scores.

Figure 2A:
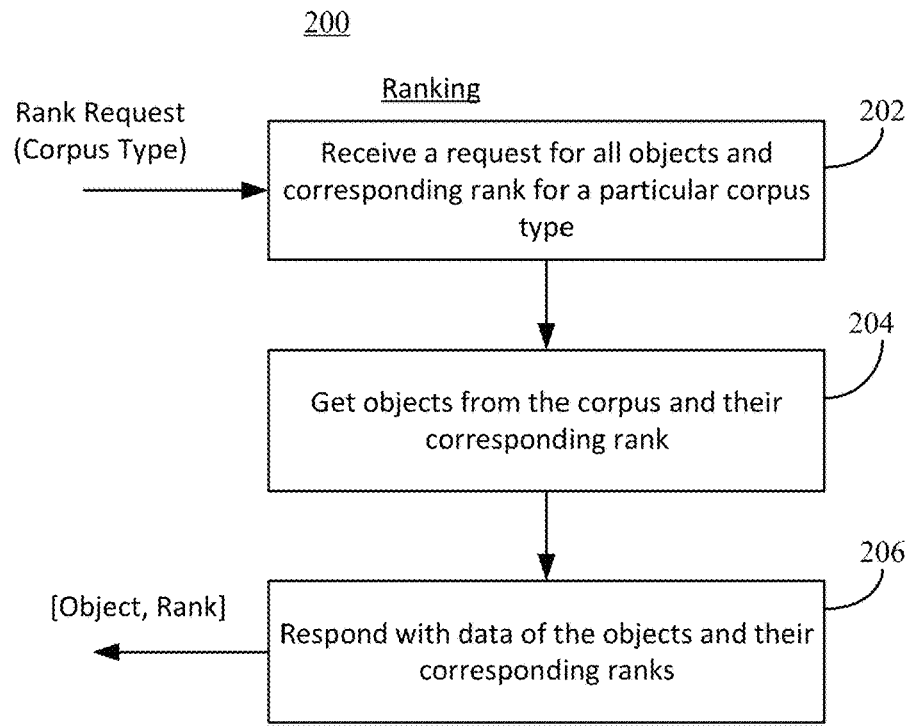
FIGS. 2A-2H illustrate example APIs for identifying, using, and managing trusted content.
Figure 2B:
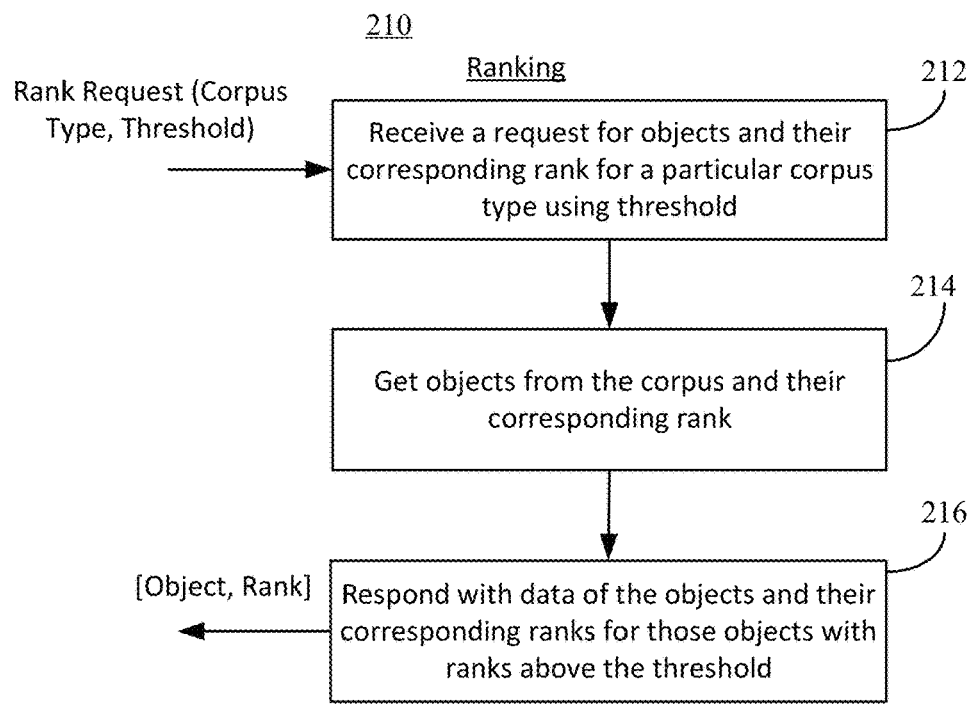
Figure 2C:
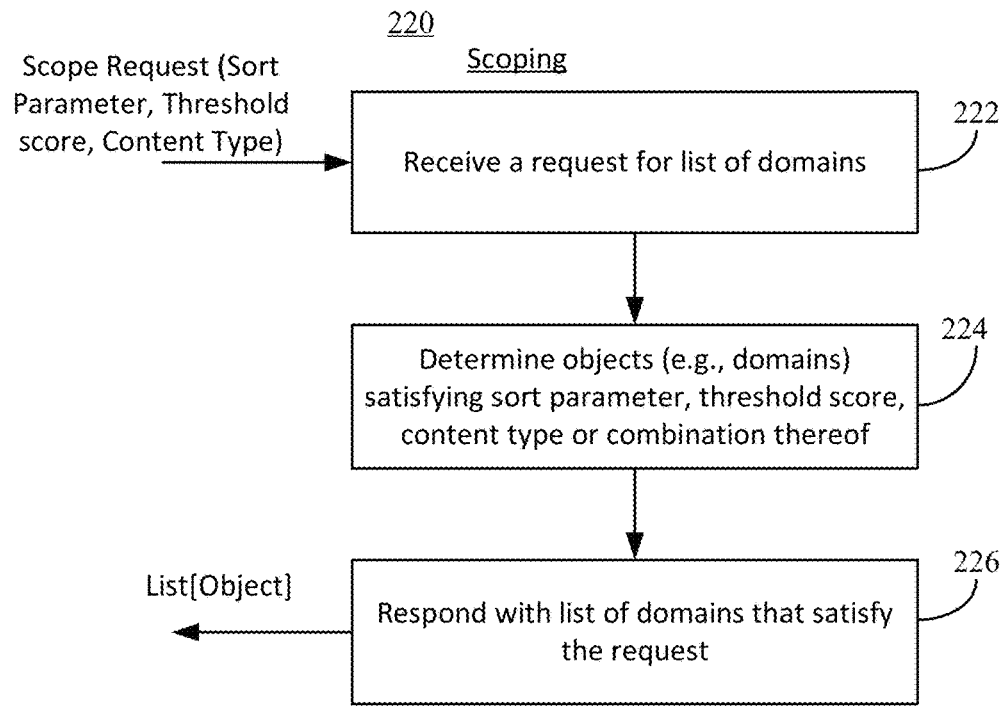

In another case, referring to FIG. 2B, the ranking API 210 can receive (212) a request for all data having a corresponding accrued score above a specified threshold. In response to receiving the request, the ranking API 210 can get (214) and provide (216), for the particular corpus type(s), the URLs or other objects having a score above the specified threshold and their corresponding rank and/or score in the corpus/corpora of the particular corpus type(s). As an example implementation of the method, the call can be GetDataWithRanking(threshold, type). The response can be a Model and provide a snapshot of the data trimmed for rankings (including scores and optionally other properties—such as described with respect to the additional properties of the enrichment API).

A scoping API is provided that can support scoped searches. In one case, referring to FIG. 2C, the scoping API 220 can receive (222) a request for a list of domains or other objects for use in a scoped search. The request can include a sort parameter (e.g., paste count, unique user count, paper count, quality score, etc.), a threshold score, and content type (e.g., all, image, table, reference). The scoping API 220 can determine (224) objects that satisfy the request and return (226) the list of domains (or other objects) that satisfy the request (e.g., using the sort parameter, threshold score, content type, or combination thereof). For example, the system can search a storage resource of a specified corpus to determine the objects that satisfy the request. As an example implementation of the method, the call can be GetDomainList(SortParam, threshold, type). The response can be a DomainList[ ] and provide the list of domains satisfying the request. In some cases, the scoping API can be used as part of a re-ranker.

In some cases, a ranking score can be produced from all or a subset of potential ranking features and provided in response to a request via one of the scoping APIs. In some cases, a developer may select a ranking function from a set of available ranking functions or provide a desired ranking function that, when communicated as part of a request, can be used to perform a custom ranking on the corpus. For example, the request for a list of domains or other objects can further request a particular ranking function and/or scoring function. As some examples, the request for a particular ranking function and/or scoring function may indicate the appropriate function from a set of available functions provided at the system receiving the request or even provide the ranking and/or scoring function themselves (as part of the message or by reference to where the function(s) can be called).

Figure 2D:
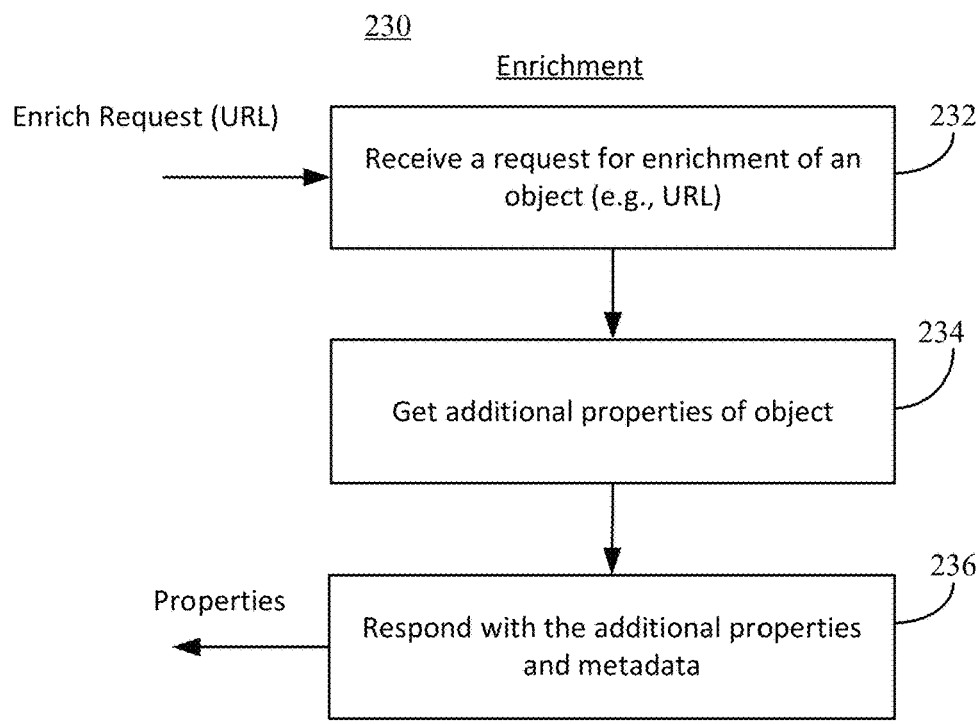
Figure 2E:
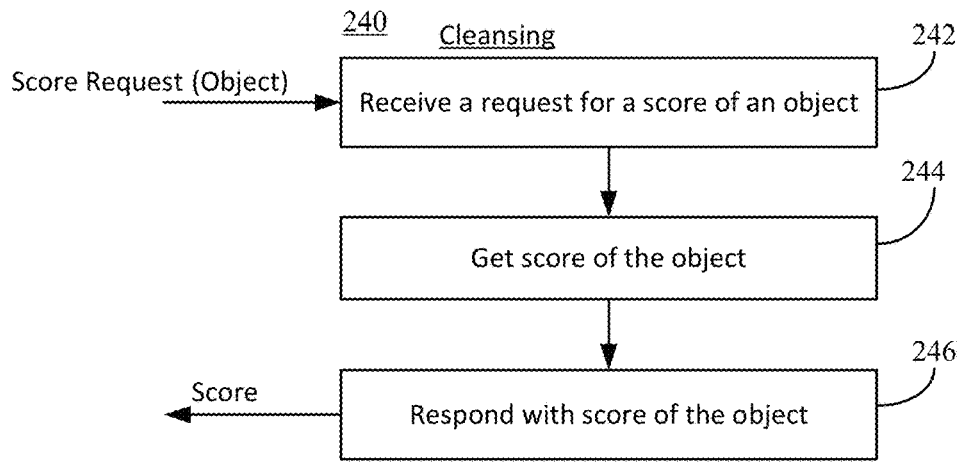

Referring to FIG. 2D, an enrichment API 230 is provided that can, in response to receiving (232) a request that includes a URL or other object, get (234) and provide (236) additional properties and metadata about the object such as a domain or page corresponding to the URL. The additional properties and metadata can be the properties and metadata stored in the corpus maintained by the system, including, but not limited to, author, publisher, year (or date) made, how much activity within productivity applications (e.g., interactions such as use and reuse), and number of times cited or referenced. As an example implementation of the method, the call can be EnrichURL(URL). The response can be a String.

A cleansing API is provided that can remove or identify domains or pages that do not satisfy a quality score from a secondary corpus. In one case, referring to FIG. 2E, the cleansing API 240 can receive (242) a request for a quality score for a particular object such as a URL with type being domain or webpage. For example, the request can include the URL and URL type (e.g., domain or webpage). In response to the request, the system can get (244) and provide (246) the score for the object. The quality score (or "score") refers to the score generated (e.g., accrued) for an object in the corpus. The score can be in the form of a real number or a probability. As an example implementation of the method, the call can be GetURLScore(URL, type). The response can be a Float and provide a quality score. In another case, referring to FIG. 2F, the cleansing API 250 can receive (252) a request for a quality score for a list of objects, for example a list of domains and/or webpages. The request can include the list of URLs and corresponding URL type(s) (e.g., domain or page). In response to the request for scores, the system can get (254) and provide (256) the scores. As an example implementation of the method, the call can be GetURLScores(URL[ ],type). The response can be List [URL,Float] and provide a list of URLs with corresponding quality scores.

In some cases, the scoring function used to determine what content in the corpus does not satisfy the quality score can be specified by the request. For example, a scoring function may be provided or a selection from a set of available scoring functions may be requested via one of the cleansing APIs. For example, the request for one or more scores can further request a particular scoring function. As some examples, the request for a particular scoring function may indicate one of a set of available scoring functions provided at the system receiving the request or even provide the scoring function itself (as part of the message or by reference to where the scoring function can be called).

Figure 2F:
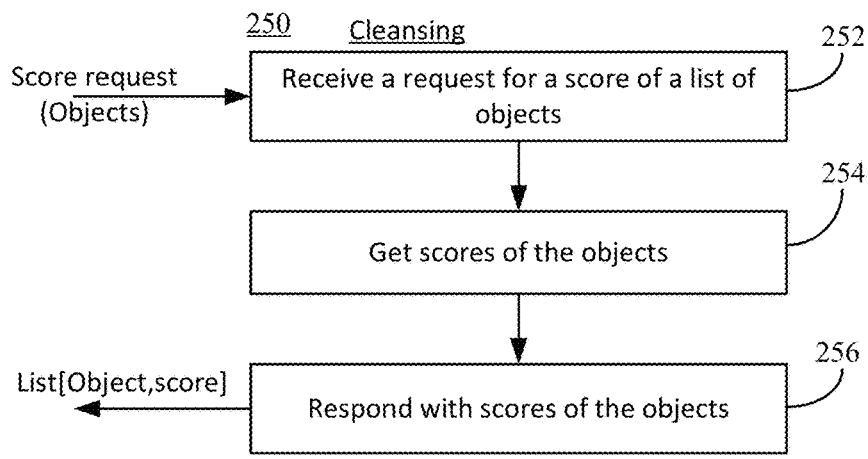
Figure 2G:
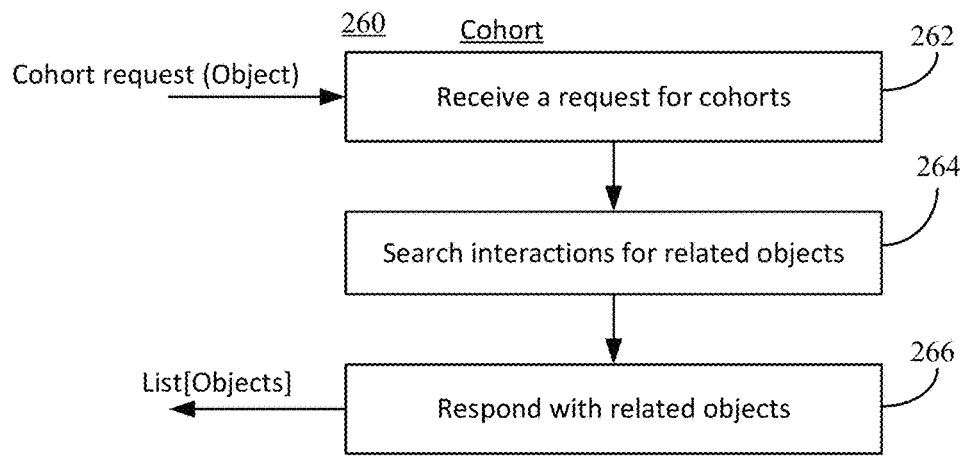

Referring to FIG. 2G, a cohorts API 260 is provided that can, in response to receiving (262) a request for related domains (or other objects) that includes one or a list of domains (or other objects), identify (264) related domains (or other objects) that may be relevant based on interactions/ graph connections; and provide (266) the related domains (or other objects). As an example implementation of the method, the call can be GetCohorts(DomainList[ ]). The response can be URL[ ] and provide the list of domains.

In some cases, a similarity function can be included in the request to provide a customized cohort determination. For example, the request for related domains (or other objects) can further request a particular similarity function. As some examples, the request for a particular similarity function may indicate one of a set of available similarity functions provided at the system receiving the request or even provide the similarity function itself (as part of the message or by reference to where the similarity function can be called). In some cases, the similarity function includes one or more rules or functions. In some cases, multiple similarity functions can be provided. The similarity function indicates the manner in which things are considered to be similar to one another. For example, one similarity function may indicate that two pages are considered similar if quoted in the same article by the same person. As another example, another similarity function may indicate that two pages are considered similar if the two pages are from a same domain and had similar content.

Figure 2H:
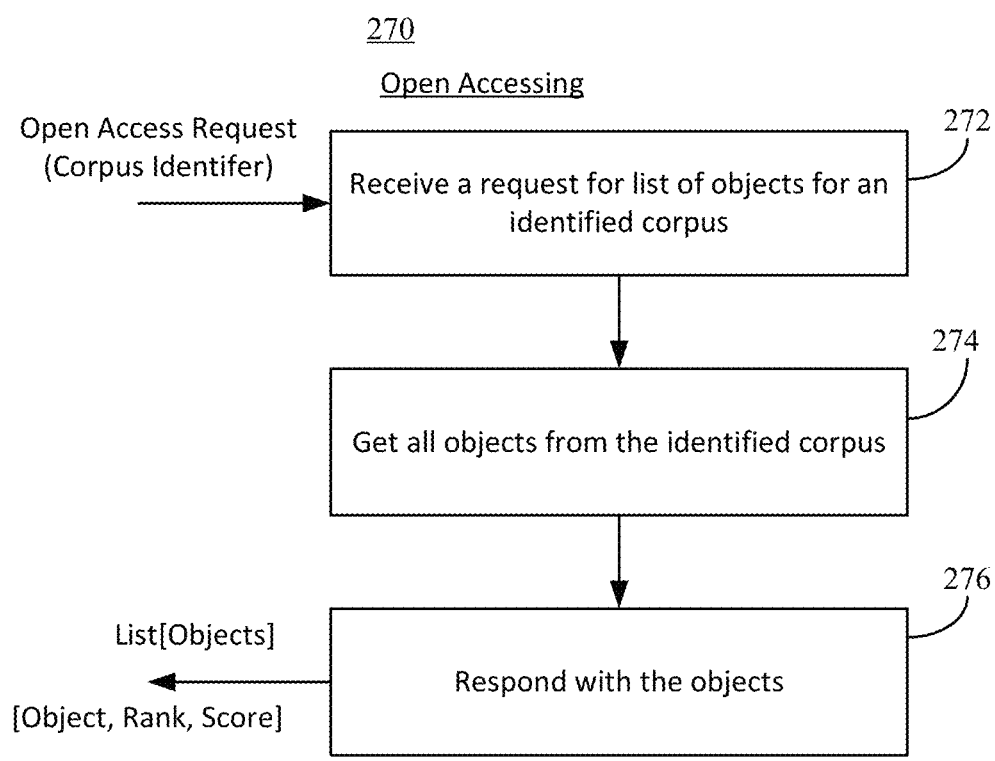

Referring to FIG. 2H, an open accessing API 270 is provided that can, in response to receiving (272) an open access request for a corpus that includes a corpus identifier, get all objects from the identified corpus (274); and provide (276) the corpus information to the source of the request. In some cases, the response can be a list of the objects in the corpus of trusted sources. In some cases, additional information such as score or rank may be provided. In yet other cases, the entire content in the corpus of trusted sources may be provided. For example, in response to receiving an open access request for an identified corpus, via the open accessing API, the system can provide the content of the corpus to a source of the open access request.

As mentioned above any service or application may use one of the described APIs to improve the functionality of that service or application.

Figure 3A:
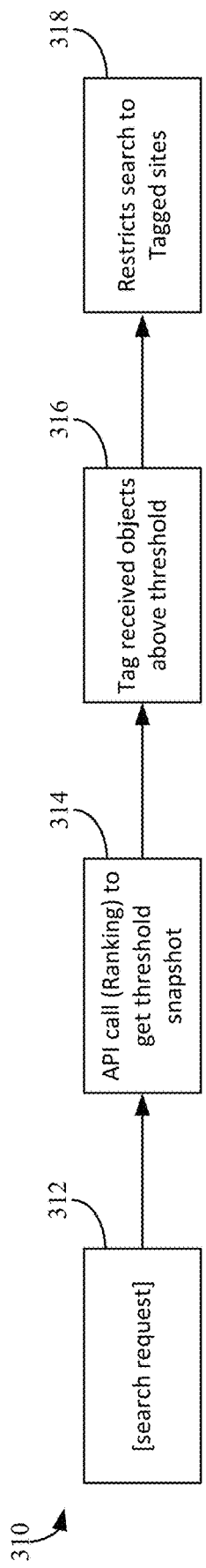
FIG. 3A illustrates use of a cleansing API by an application.

FIG. 3A illustrates use of a ranking API by an application. Referring to FIG. 3A, a process 310 can be performed by an application that incorporates a search feature. The application can receive a search request (312) and perform (314) an API call, for example, to the ranking API 210 such as shown in FIG. 2B. The API request can include a threshold and corpus type. The results can include snapshot of objects above threshold and the application can tag the received objects that are above the threshold (316). The application can then restrict the search to the tagged sites (318).

Figure 3B:
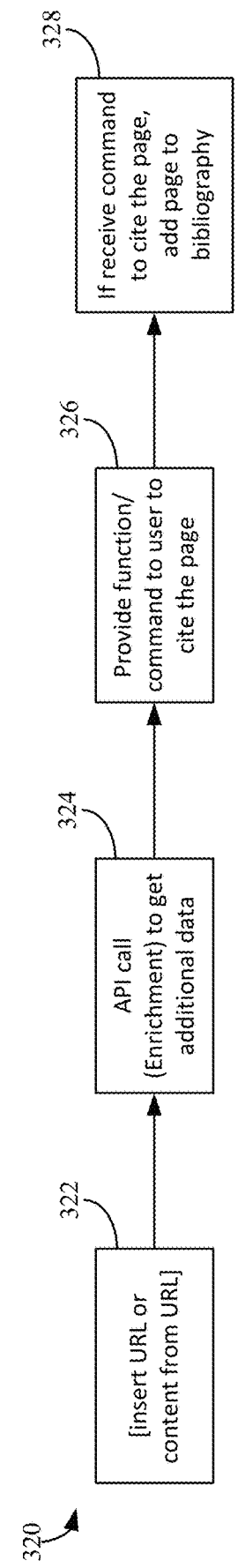
FIG. 3B illustrates use of a ranking API by an application.

FIG. 3B illustrates use of an enrichment API by an application. Referring to FIG. 3B, a process 320 can be performed by an application such as a productivity and/or content creation application. For example, in response to receiving an insertion (322) of a URL or content from a URL, the application can perform (324) an API call, for example to the enrichment API 230 as shown in FIG. 2D. The application can receive additional properties of the URL, such as author and year of publication, and provide a function or command to a user to cite the page or source of the URL (326); and if the application receives selection of the command to cite the page or source of the URL, add (328) the page to a bibliography.

Figure 3C:
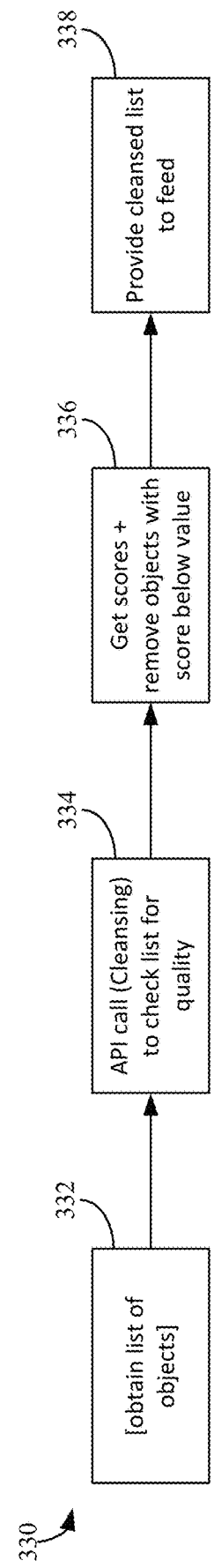
FIG. 3C illustrates use of an enrichment API by an application.

FIG. 3C illustrates use of a cleansing API by an application. Referring to FIG. 3C, a process 330 can be performed by an application that incorporates a feature with a news feed or document feed (or recommender feed). The application can perform a function that obtains (332) a list of objects (e.g., documents, URLs) that are intended for the feed. The application can perform (334) an API call, for example to the cleansing API 250 as shown in FIG. 2F, to check the list for quality. For example, in response to sending a request, the application can receive the scores for the objects in the list and remove objects in the list with a score below a designated value (336). In some cases, the application can organize, or re-rank based on the scores. Once the objects have been cleansed (and in some cases, re-ranked), the objects can be presented (338) in a feed.

Other applications and scenarios are contemplated. For example, a search on Enterprise systems (on-premises or multi-tenant) can use the ranking, scoping, or cleansing API in search functionality for the particular enterprise and get a list of ranked content, for example a threshold snapshot, which may then be used to order or reorder results based on trust score.

In some implementations the scoring for the content in the corpora can involve a document activity score (DAS), a document attribute boost (DAB), a user history boost (UHB), and combinations thereof. This scoring may be generated as described in application Ser. No. 15/872,785, which is incorporated herein by reference in its entirety to the extent that it is not inconsistent with the features described herein.

For example, a DAS can be applied to a domain, webpage, object, or other content. The DAS is directed to application activity, for example, the types of activities carried out on a document. The value for the DAS is determined by the complexity of the task and indication for professional context. High value tasks performed on URLs will be scored and the page and domain of the URL will be placed in a stack. The DAS provides a base score for the page and the site. Further actions will then accrue to the value of the asset (the asset being the URL).

As an example, an application activity can be assigned score of 0-10 for the DAS. An application activity is assigned a value of operation. This scoring system can be stored in any suitable structure and retrieved by the system to be used when applying a score to a particular document activity with respect to a URL or other object.

High value seeding can impact low value scoring. After a site/page first gets added to the stack, it is considered "seeded". Certain signals which score zero for non-seeded sites/pages will now start scoring and accrue value to the object and user. As an illustrative example, inserting a URL that is not previously known ("non-seeded") can be given the value of 0. In some cases, any activity with respect to a URL or other object may only be scored if the URL or other object has been previously seeded. In some cases, such as for certain enterprise scenarios (due to the more trusted nature of the enterprise environment as compared to the public web), non-seeded URLs (or objects) may also receive a score. The trusted nature of the enterprise environment can permit additional flexibility in scoring and control by tenant administrators so that the scoring system is adjustable for individual tenants.

It should be understood that the "insertion" of a URL or other object may be carried out via any one of numerous commands that input content to a location or file and may even be broadly interpreted to include typing, speaking or inking a citation of a source for content in the file.

Both the value and the attribute (as a string or an identifier of the activity) for the DAS may be stored as metadata for the URL (or other object).

From the base line of the DAS, a boost can be added. A DAB can be assigned to the document (e.g., the file) in which the URL is used/acted upon. The context of a document activity determines the level of boost the DAS can get. The value of an attribute may be a reflection of the professionality of the context of the action. Boost values are additive so that where multiple attributes are present in the document, the associated values of those attributes can be added together to generate the DAB. An example boost can be from attribute values of 0.1-1.0. In this illustrative example, various attributes, labeled as defined document characteristics, can be assigned particular values. Defined document characteristics can include, but are not limited to, size of document or file, number of pages, number of words, number of lines, number of slides, number of math symbols used, number of occupied cells, whether the document has an applied style or formatting, as well as other information about the document.

It should be understood that the term "document" as used herein refers to any file with a file format used by a productivity application and not just a word processing application. For example, spreadsheets, presentations, email, notebooks, and other files are included in the term "document". The individual values and their corresponding attributes (as a string or an identifier of the activity) for the DAB may be stored as metadata for the URL.

In some further implementations, UHB can be included. As with the DAS and the DAB, the UHB can be stored as metadata with the URL. High value activities of a user can give a boost to the scores. In some cases, membership and/or profile information in professional networks, for example the LinkedIn network, can be used to identify users to apply UHB. The DAB boosted DAS can directly accrue to the UHB to increase the user value. That is, the attribute values from the document attributes and the document activities made by a user (individually or as part of a tenant) can be collected over time and used to generate a UHB value for the user (and possibly for an enterprise as a whole). The UHB may be used to minimize spam and users tricking the system.

The DAS, DAB, and UHB may each include negative values, resulting in a negative score. The negative scores can be used by the system to minimize spam from entering and/or remaining in the corpus. In addition, for enterprise scenarios, tenant administrators may customize the system for score and boosts.

For example, an activity with respect to a URL can be detected and scored. In some cases, the URL can be split, with the domain and score added to a domain stack (which then contains just the domain) and the page and score added to a page stack (which then contains the full URL).

Figure 4A:
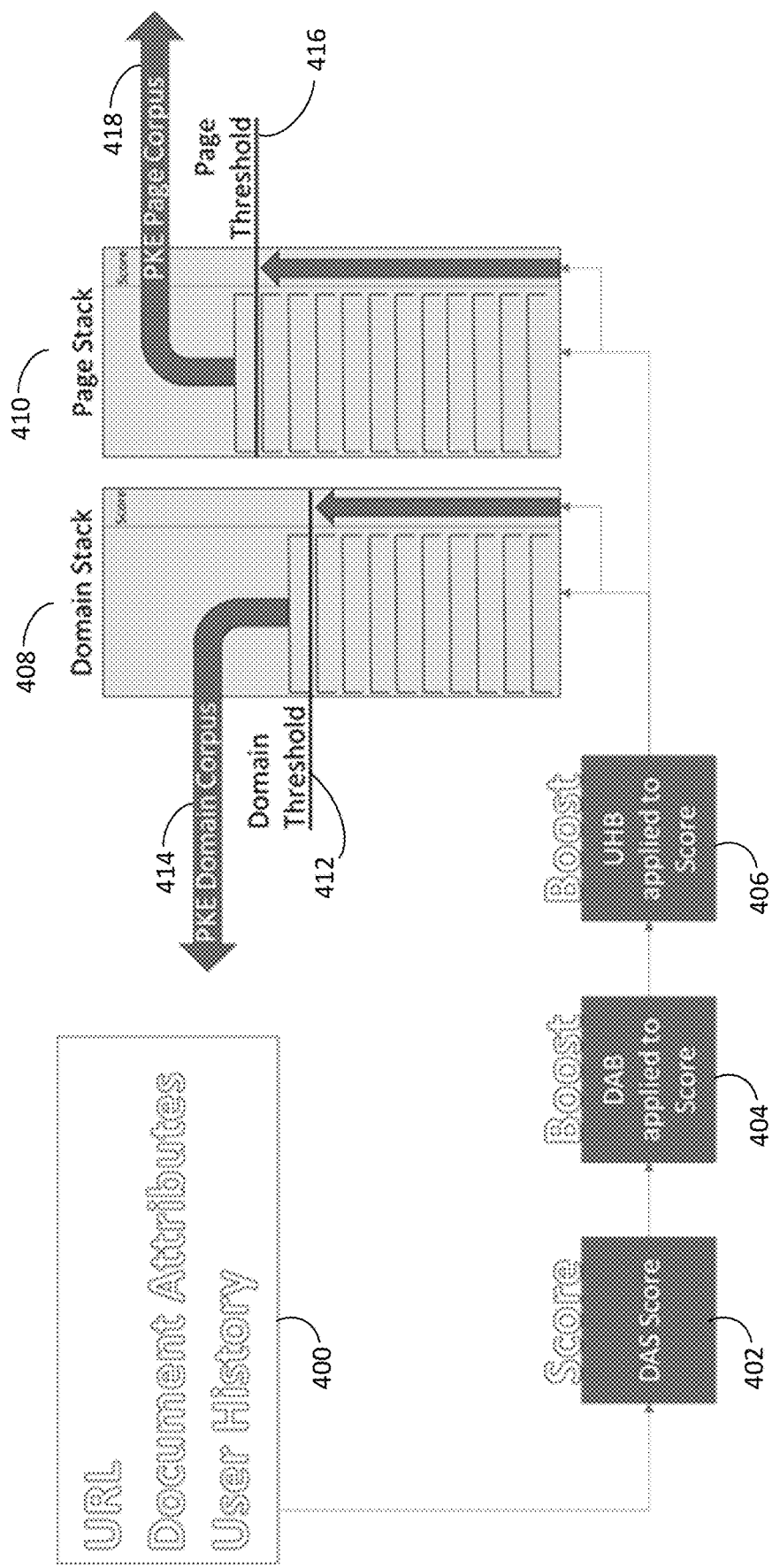
FIGS. 4A and 4B illustrate conceptual schematics of the process flow into content stacks.
Figure 4B:
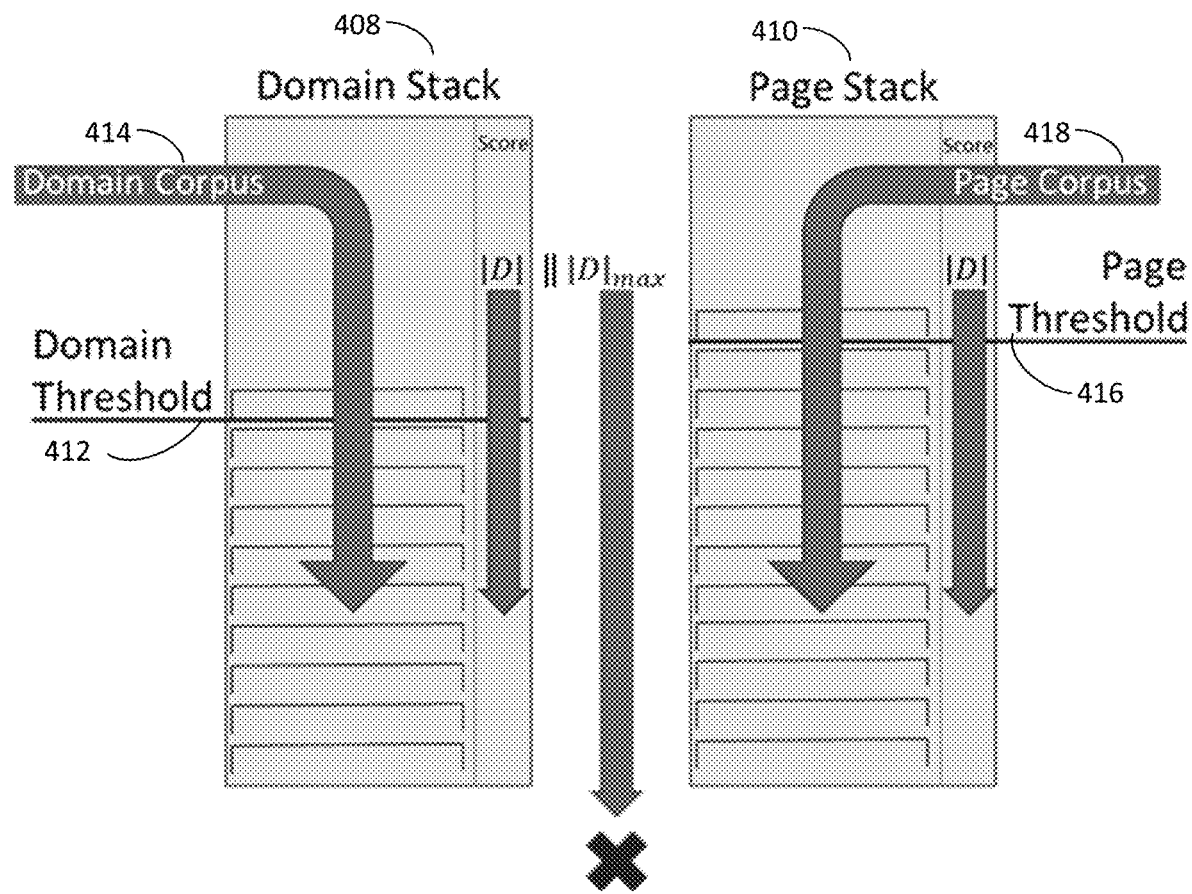

FIGS. 4A and 4B illustrate conceptual schematics of the process flow into content stacks. Referring to FIG. 4A, a URL may come in to the scoring system (e.g., be identified for scoring by the scoring system) due to an activity operation (e.g., insert, paste) with respect to a document being authored within a productivity application at a user device. The URL (or other object), activity, document attributes and user history (collectively 400) can be provided to a server performing method 500. The particular information provided to the server may vary depending on environment. For example, in an enterprise/business environment, particularly where all users are part of a specific organization (or are given guest or vendor access to that system), additional details about the user, hierarchy within the organization, and even information about the content itself may be provided to the server (since the trusted sources would be managed and maintained for the enterprise in what may be a private corpus and not a public corpus). In contrast, for home/public productivity application scenarios, additional layers of privacy are expected and any data collected would require user permission and, even with user permission, information that is provided to the server may maintain anonymization. In both enterprise and home/public scenarios, it should be understood that any information sent to, and received by, the server would be carried out with respect to the privacy and security policies in place.

After receiving 400, a DAS Score is generated (402) for the URL (or other object) and then boosted, for example by applying the DAB (404) and applying the UHB (406) to the DAS Score. The applying of the DAB (404) and applying of the UHB (406) can result in a DAB and UHB boosted score equal to f(DAS,DAB,UHB), where the score is a function of the DAS, DAB, and UHB.

The URL and its boosted score are stored and the score monitored to determine if/when the score reaches a threshold to move the URL to the corpus. The domain and page of the URL can be separately monitored for adding to a corpus. For example, the domain (and its score) can be added to a domain stack 408 and the page (and its score) can be added to the page stack (410). As a previously existing domain and page has activity (for example through actions within the same or other productivity application by the user at device or the same or different users at other devices), the new boosted scores can be added to the existing score. When the domain score reaches a domain threshold 412, that domain can be moved to the domain corpus 414. In addition, when a page score reaches a page threshold 416, that page can be moved to the page corpus 418. The domains, pages, and respective scores can be stored in a storage resource, which may be made up of one or more storage devices. The storage resource can be "flat storage" that stores values of the domain, page, score, and any metadata including the data used to apply and/or boost the score.

Referring to FIG. 4B, it is possible to have objects removed from a corpus, particularly as their scores decrease through, for example, negative scores added to the existing scores. The negative scores can cause the objects to drop below the thresholds, even to negative values. User reporting of undesired content may be used to remove content from corpus. The type of inappropriateness determines the magnitude of the score |D| of both domain and page back into the stack or complete removal (referred to as $|D|_{max}$). Domain removal can cause page removal. The UHB score can have a great impact on |D| addition, inactive domains and sites can age out over time.

Figure 5:
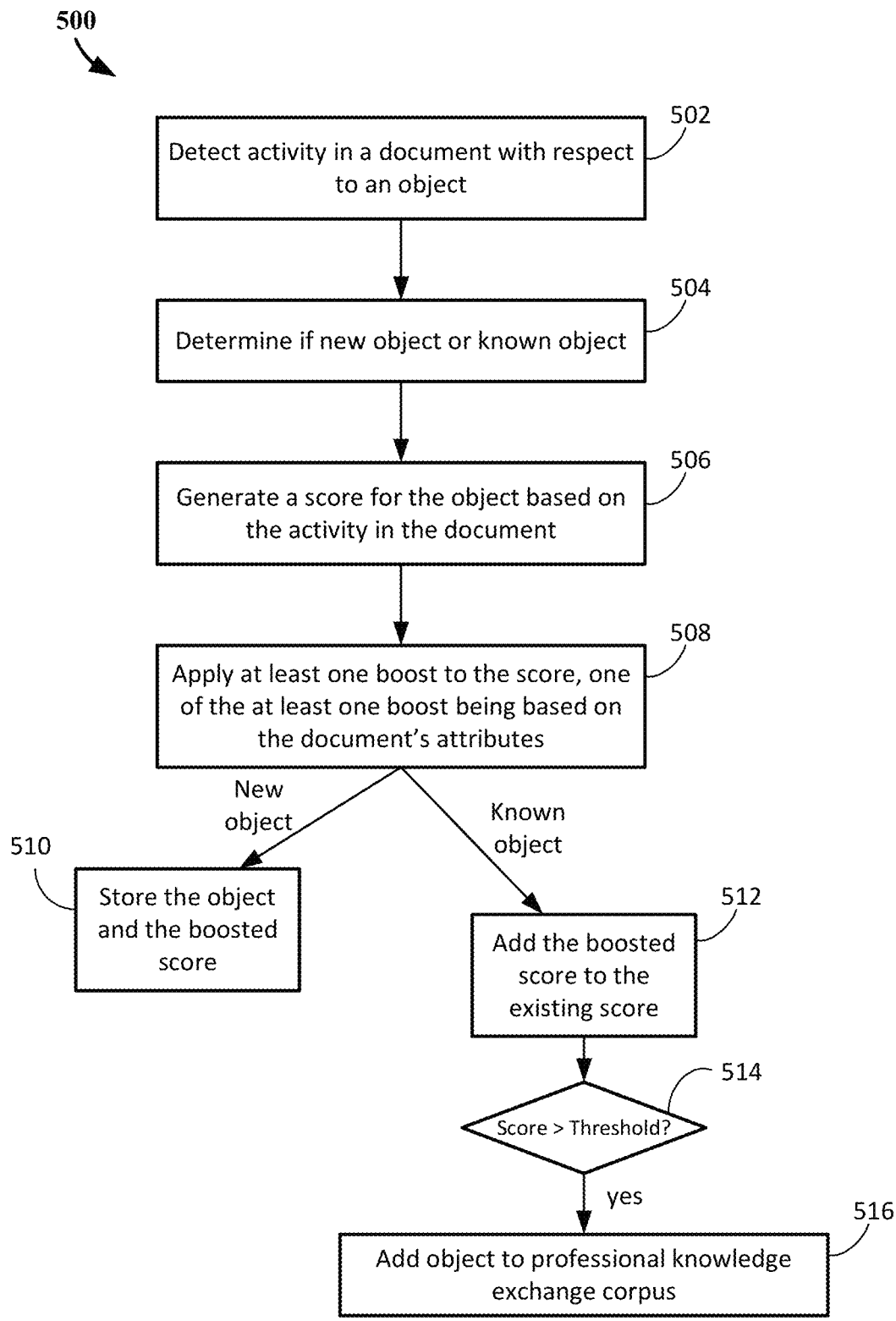
FIG. 5 illustrates a method performed by a system for identifying, using, and managing trusted sources in online and networked content for professional knowledge exchange.

FIG. 5 illustrates a method performed by a system for identifying, using, and managing trusted sources in online and networked content for professional knowledge exchange. Method 500 can include detecting activity in a document with respect to an object (502) and determining if the object is anew object or a known object (504). The detecting (502) of activity in the document may be a result of receiving information from productivity application software of a user action, the object, and document attributes. User history information may be included with the information or retrieved separately. Certain information about the document (e.g., document attributes) may be provided (with user permission) from the productivity application and/or other software application to the server.

Regarding operation 504, a "known" object is an object that has already been seeded (e.g., exists) in the storage. The determining (504) of whether the object is new or known can be performed by querying or otherwise searching storage to determine if the object is in the storage; if so, the object is known. Operation 504 may be performed before, during, or after operations 506 and/or 508.

The method can continue with generating a score for the object based on the activity in the document (506). At least one boost can be applied to the score (508). One of the at least one boost is based on the document's attributes. Another boost can be the user history. Of course other weights, multipliers, and additions can be used. A table or other structure indicating attributes and values may be stored by a server performing method 500 and retrieved by the server to perform the boost(s).

If the object is the new object, the object and the boosted score is stored (510). If the object is the known object, the boosted score is added to the existing score in the storage (512). The score is checked to see if the score is greater than (or equal to or greater than) a threshold (514), when it is equal to or greater than (or just greater than) the threshold, then the object is added to the professional knowledge exchange corpus (516). Even when added to the corpus, it is possible to continue to have the score of the object updated. In this manner, it is also possible for an object to fall from the corpus due to sufficient negative scores (that cause the score to fall below the threshold).

Figure 6:
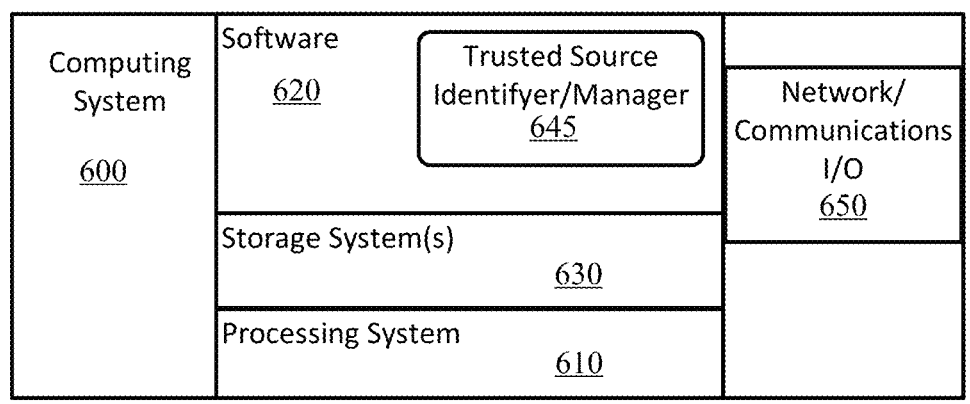
FIG. 6 illustrates components of a computing system that may be used to implement certain methods and services described herein.

FIG. 6 illustrates components of a computing system that may be used to implement certain methods and services described herein.

Referring to FIG. 6, system 600 may be implemented within a single computing device or distributed across multiple computing devices or sub-systems that cooperate in executing program instructions. In some cases, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device. The system 600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 600 can include a processing system 610, which may include one or more processors and/or other circuitry that retrieves and executes software 620 from storage system 630. Processing system 610 may be implemented within a single processing device but may also be distributed across multiple processing devices or sub-systems that cooperate in executing program instructions.

Storage system(s) 630 can include any computer readable storage media readable by processing system 610 and capable of storing software 620. Storage system 630 may be implemented as a single storage device but may also be implemented across multiple storage devices or sub-systems co-located or distributed relative to each other. Storage system 630 may include additional elements, such as a controller, capable of communicating with processing system 610. Storage system 630 may also include storage devices and/or sub-systems on which data such as entity-related information is stored.

Software 620 may be implemented in program instructions and among other functions may, when executed by system 600 in general or processing system 610 in particular, direct the system 600 or processing system 610 to operate in accordance with the instructions. For example, when software 620 includes service 645 the processing system can be directed to identification and management of vetted and trusted sources (and its various components and functionality), including process 500 as described with respect to FIG. 5. In some cases, software 620 can include functionality for the APIs as described with respect to FIGS. 2A-2G. Similar structures and components can be used to embody computing devices in which applications that use the described APIs can be implemented. In addition, system 600 may implement on-premises systems and/or data centers for cloud services.

In embodiments where the system 600 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 650 may be included, providing communication connections and devices that allow for communication between system 600 and other computing systems (not shown) over a communication network or collection of networks (not shown) or the air.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. It should be understood that as used herein, in no case do the terms "storage media", "computer-readable storage media" or "computer-readable storage medium" consist of transitory, propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer-readable storage media having instructions stored thereon that, when executed by a processing system, direct the processing system to:
    provide a plurality of application programming interfaces (APIs), wherein the plurality of APIs comprises a ranking API;
    in response to receiving a request for ranked objects, via the ranking API of the plurality of APIs, obtain objects from a corpus identified by the request for ranked objects and a corresponding rank and/or score of each of the objects and provide the objects and the corresponding rank and/or score of each of the objects to a source of the request for ranked objects, wherein the corpus stores identified trusted sources comprising the objects having scores that are scored based at least on a document activity score, wherein the corresponding rank of each of the objects is based on the score of each of the objects;
    wherein the document activity score is based at least in part on use, reuse, and citing of content.

2. The media of claim 1, wherein the request for ranked objects further comprises a threshold, wherein a response to the request for ranked objects provides the objects and the corresponding rank and/or score of each of the objects with scores above the threshold.

3. The media of claim 1, wherein the request for ranked objects further requests a particular ranking function.

4. The media of claim 1, wherein the plurality of APIs further comprises a scoping API, the media further comprising instructions that direct the processing system to:
    in response to receiving a request for scoped objects, via the scoping API of the plurality of APIs, obtain objects from the corpus that satisfy a sort parameter, threshold score, content type or combination thereof provided with the request for scoped objects and provide a list of objects that satisfy the request for scoped objects to a source of the request for scoped objects.

5. The media of claim 1, wherein the plurality of APIs further comprises an enrichment API, the media further comprising instructions that direct the processing system to:
    in response to receiving a request for enrichment of an object, via the enrichment API of the plurality of APIs, obtain additional properties of the object from the corpus and provide the additional properties to a source of the request for enrichment.

6. The media of claim 1, wherein the plurality of APIs further comprises a cleansing API, the media further comprising instructions that direct the processing system to:
    in response to receiving a request for a score of one or more objects, via the cleansing API of the plurality of APIs, obtain the score of each of the one or more objects from the corpus and provide the score of each of the one or more objects to a source of the request for the score.

7. The media of claim 1, wherein the plurality of APIs further comprises a cohorts API, the media further comprising instructions that direct the processing system to:
    in response to receiving a request for cohorts of an object, via the cohorts API of the plurality of APIs, search interactions associated with the corpus for related objects and provide the related objects.

8. The media of claim 1, wherein at least one of the objects is a URL domain or page.

9. The media of claim 1, wherein at least one of the objects is a document or a part of a document.

10. A system comprising:
    a processing system;
    one or more storage media including a storage resource;
    instructions for identifying, using, and managing trusted sources in online and networked content stored on at least one of the one or more storage media, the instructions directing the processing system to at least:
    provide a plurality of application programming interfaces (APIs), wherein the plurality of APIs comprises a ranking API, a scoping API, and a cleansing API;
    in response to receiving a request for ranked objects, via the ranking API of the plurality of APIs, obtain objects from a corpus identified by the request for ranked objects and a corresponding rank and/or score of each of the objects and provide the objects and the corresponding rank and/or score of each of the objects to a source of the request for ranked objects, wherein the corpus stores identified trusted sources comprising the objects having scores that are scored based at least on a document activity score, wherein the corresponding rank of each of the objects is based on the score of each of the objects;
    wherein the document activity score is based at least in part on use, reuse, and citing of content;
    in response to receiving a request for scoped objects, via the scoping API of the plurality of APIs, obtain objects from the corpus that satisfy a sort parameter, threshold score, content type or combination thereof provided with the request for scoped objects and provide a list of objects that satisfy the request for scoped objects to a source of the request for scoped objects; and in response to receiving a request for a score of one or more objects, via the cleansing API of the plurality of APIs, obtain the score of each of the one or more objects from the corpus and provide the score of each of the one or more objects to a source of the request for the score.

11. The system of claim 10, wherein the request for ranked objects further comprises a threshold, wherein a response to the request for ranked objects provides the objects and the corresponding rank and/or score of each of the objects with scores above the threshold.

12. The system of claim 10, wherein the plurality of APIs further comprises an enrichment API, the media further comprising instructions that direct the processing system to:

in response to receiving a request for enrichment of an object, via the enrichment API of the plurality of APIs, obtain additional properties of the object from the corpus and provide the additional properties to a source of the request for enrichment.

13. The system of claim 12, wherein the additional properties comprise: author, publisher, date, interactions of use and reuse with the object, number of times cited or referenced, or combination thereof.

14. The system of claim 10, wherein the plurality of APIs further comprises a cohorts API, the media further comprising instructions that direct the processing system to:

in response to receiving a request for cohorts of an object, via the cohorts API of the plurality of APIs, search interactions associated with the corpus for related objects and provide the related objects.

15. The system of claim 10, wherein the object is a URL domain or page, a document, or a part of a document.

16. The system of claim 10, wherein the corpus is a web-based corpus or enterprise corpus.

17. The system of claim 10, wherein the plurality of APIs further comprises an open accessing API, the media further comprising instructions that direct the processing system to:

in response to receiving an open access request for an identified corpus, via the open accessing API of the plurality of APIs, provide the content of the corpus to a source of the open access request.

18. A method comprising:

providing a plurality of application programming interfaces (APIs), wherein the plurality of APIs comprises a ranking API;

in response to receiving a request for ranked objects, via the ranking API, obtaining objects from a corpus identified by the request for ranked objects and a corresponding rank and/or score of each of the objects and providing the objects and the corresponding rank and/or score of each of the objects to a source of the request for ranked objects, wherein the corpus stores identified trusted sources comprising the objects having scores that are scored based at least on a document activity score, wherein the corresponding rank of each of the objects is based on the score of each of the objects;

wherein the document activity score is based at least in part on use, reuse, and citing of content.

19. The method of claim 18, wherein the request for ranked objects further comprises a threshold, wherein a response to the request for ranked objects provides the objects and the corresponding rank and/or score of each of the objects with scores above the threshold.

20. The method of claim 18, wherein the plurality of APIs further comprises a scoping API, the method further comprising:

in response to receiving a request for scoped objects, via the scoping API of the plurality of APIs, obtaining objects from the corpus that satisfy a sort parameter, threshold score, content type or combination thereof provided with the request for scoped objects and providing a list of objects that satisfy the request for scoped objects to a source of the request for scoped objects.

* * * * *